(12) United States Patent
Lee et al.

(10) Patent No.: US 7,584,284 B2
(45) Date of Patent: Sep. 1, 2009

(54) PATH-TOKEN-BASED WEB SERVICE CACHING METHOD

(75) Inventors: Daeha Lee, Daejeon (KR); Byoung Youl Song, Daejeon (KR); Rockwon Kim, Daejeon (KR); Jin Young Moon, Daegu (KR); Yeon Jun Kim, Daejeon (KR); Moonyoung Chung, Daejeon (KR); Kyung Il Kim, Daejeon (KR); Seung Woo Jung, Daejeon (KR); Hyeonsung Cho, Daejeon (KR); Young Jo Cho, Seongnam (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 449 days.

(21) Appl. No.: 11/635,133

(22) Filed: Dec. 7, 2006

(65) Prior Publication Data

US 2007/0136435 A1 Jun. 14, 2007

(30) Foreign Application Priority Data

Dec. 8, 2005 (KR) .................. 10-2005-0120071
May 17, 2006 (KR) .................. 10-2006-0044258

(51) Int. Cl.
*G06F 15/173* (2006.01)
(52) U.S. Cl. .................................................. 709/227
(58) Field of Classification Search ............... 709/227, 709/217, 219
See application file for complete search history.

(56) References Cited

U.S. PATENT DOCUMENTS 7,093,073 B2 * 8/2006 Truty ..................... 711/118

(Continued)

FOREIGN PATENT DOCUMENTS

| JP | 2004-274355 | 9/2004 |
| KR | 1020040051876 A | 6/2004 |
| KR | 1020050000122 A | 1/2005 |

OTHER PUBLICATIONS

"Caching of XML Web Services to Support Disconnected Operation" by Justin Reabow et al.; *Technical Report No. CS04-09-00*; Department of Computer Science, University of Cape Town; Oct. 21, 2004.

(Continued)

*Primary Examiner*—David Y Eng
(74) *Attorney, Agent, or Firm*—Blakely, Sokoloff, Taylor & Zafman LLP

(57) ABSTRACT

Provided is a path-token-based web service caching method including determining whether or not stored cache data exists when a web service call request exists, and when the cache data does not exist, creating a predetermined path-token set and a predetermined tag data set based on a message schema of Web Services Description Language (WSDL), and creating a request Simple Object Access Protocol (SOAP) message, creating a request SOAP message template by using a path-token for the created request SOAP message, and calling the web service, and creating cache data including the tag data set, input values set, the request SOAP message template, the request SOAP message, and SOAP binding information. Accordingly, the method can solve the problems of a conventional web service caching method whereby the method can not cope with change in the number of inputs, and an exact input position is not searched for when an input value is changed. Therefore, it is possible to implement an efficient web service call environment by web service caching.

19 Claims, 13 Drawing Sheets

U.S. PATENT DOCUMENTS 7,188,155 B2 * 3/2007 Flurry et al. ................ 709/219
7,370,075 B2 * 5/2008 Farquharson et al. ....... 709/203
7,467,206 B2 * 12/2008 Moore et al. ................ 709/225
7,512,691 B2 * 3/2009 Sohda et al. ................ 709/227

OTHER PUBLICATIONS

"Soap Optimization via Parameterized Client-Side Caching" by Kiran Devaram et al.; Manhattan, KS; *Parallel and Distributed Computing and Systems*—2003.

* cited by examiner

PATH-TOKEN-BASED WEB SERVICE CACHING METHOD

CROSS-REFERENCE TO RELATED PATENT APPLICATION

This application claims the benefits of Korean Patent Application No. 10-2005-0120071, filed on Dec. 8, 2005, and Korean Patent Application No. 10-2006-0044258, filed on May 17, 2006, in the Korean Intellectual Property Office, the disclosures of which are incorporated herein in their entirety by reference.

BACKGROUND OF THE INVENTION

1. Field of the Invention

The present invention relates to a web service caching method based on a path-token for implementing an efficient web service call environment capable of rapidly modifying a request Simple Object Access Protocol (SOAP) message template according to a change in the number of inputs of a web service operation, and solving a problem of a request SOAP message being re-created when the number of inputs or input values are changed in the conventional web service caching method by including a path-token in an input node portion of the request SOAP message template in order to search for an exact input position, thereby implementing the efficient web service call environment.

2. Description of the Related Art

Web services are known as reusable software components which can call remote methods from the Internet-based distributed computing environment using open standards based on Extensible Markup Language (XML). The web services are implemented based on the XML-based standards of SOAP, Web Services Description Language (WSDL), and Universal Description, Discovery, and Integration (UDDI). The SOAP is a message exchange protocol defining a format of a message which is transmitted or received between a web service provider and a web service requester. The WSDL is a service specification including a detailed description of the associated web services. The UDDI is a specification for a type of web service registry which registers and retrieves web services. The standards associated with the web services such as SOAP, WSDL, and UDDI are open standards based on XML. The SOAP and the WSDL are managed by the World Wide Web Consortium (W3C) which deals with the standards associated with World Wide Web. The UDDI is a standard specification managed by the Organization for the Advancement of Structured Information Standards (OASIS) which is known by the electronic business XML (ebXML) set of specifications.

As described above, the web services are based on XML, and so the web services have advantages of good extensibility and flexibility. However, in terms of functions, there are problems in that processing speed decreases and memory consumption increases according to XML encoding/decoding. To solve the aforementioned problems, a web service caching method is used. In the method, a request SOAP message, once used, is cached, so that the SOAP message is reused when the same web service operation is called, thereby saving time and memory for creating the request SOAP message. However, when the number of inputs and input values of the web service operation are changed, the cached request SOAP message cannot be used, and so a new request SOAP message has to be created. When the number of inputs of the web service operation is changed, the number of the cached request SOAP message is different from the number of inputs of the new web service operation. Therefore, a request SOAP message having an input of the new web service operation is needed. When the input value of the web service operation is changed, the cached request SOAP message has the input value of the operation which is previously called, so that a result corresponding to the changed input value cannot be obtained. Therefore, as described above, the new request SOAP message is created. To cope with the change in the input values of the web service operation, tag information of the input of the changed web service operation is stored, and when the value is changed, the tag information is retrieved from the cached request SOAP message, so that the value may be modified. However, a portion to-be-modified cannot be retrieved by using only the tag information. This is because several inputs having the same tag information may exist in a message.

Accordingly, in order to implement an efficient web service call environment, the conventional web service caching method must be improved, and a new web service caching method is required to rapidly and actively cope with the change in input values and the number of inputs.

SUMMARY OF THE INVENTION

The present invention provides a web service caching method capable of creating a path-token set and a tag data set, creating a request Simple Object Access Protocol (SOAP) message template by applying a path-token, creating a message template using the tag data set, modifying the request SOAP message template according to change in the number of inputs of a web service operation, and creating a request SOAP message on the basis of the request SOAP message template using the path-token. See Claims for further changes to Summary According to an aspect of the present invention, there is provided a path-token-based web service caching method including: determining whether or not stored cache data exists when a web service call request exists; when the cache data does not exist, creating a predetermined path-token set and a predetermined tag data set based on a message schema of Web Services Description Language (WSDL), and creating a request SOAP message; creating a request SOAP message template by applying a path-token on the created request SOAP message, and calling the web service; and creating cache data including the tag data set of web service operation, input values set, the request SOAP message template, the request SOAP message, and SOAP binding information.

According to another aspect of the present invention, there is provided a web service caching method based on cache data created based on a path-token set and a tag data set, including: extracting the cache data; determining whether or not the number of inputs of a web service operation is equal, when the number is not equal, modifying a request SOAP message template using a path-token, and when the number is equal, determining whether or not an input value of the web service operation is changed; when the input value of the web service operation is not determined to be changed, using a request SOAP message of the cache data, and when the input value of the web service operation is determined to be changed, creating a request SOAP message by using the request SOAP message template; and storing the cache data and calling the web service.

According to another aspect of the present invention, there is provided a path-token-based web service caching method including: determining whether or not stored cache data exists when a web service call request exists; when the stored cache data does not exist, creating cache data by creating a predetermined path-token set and a predetermined tag data set based on a message schema of WSDL; and when the stored cache data exists, extracting the cache data, determining whether or not to modify an SOAP message according to a change in the number of inputs of a web service operation and a change in an input value of the web service operation, and calling the web service.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
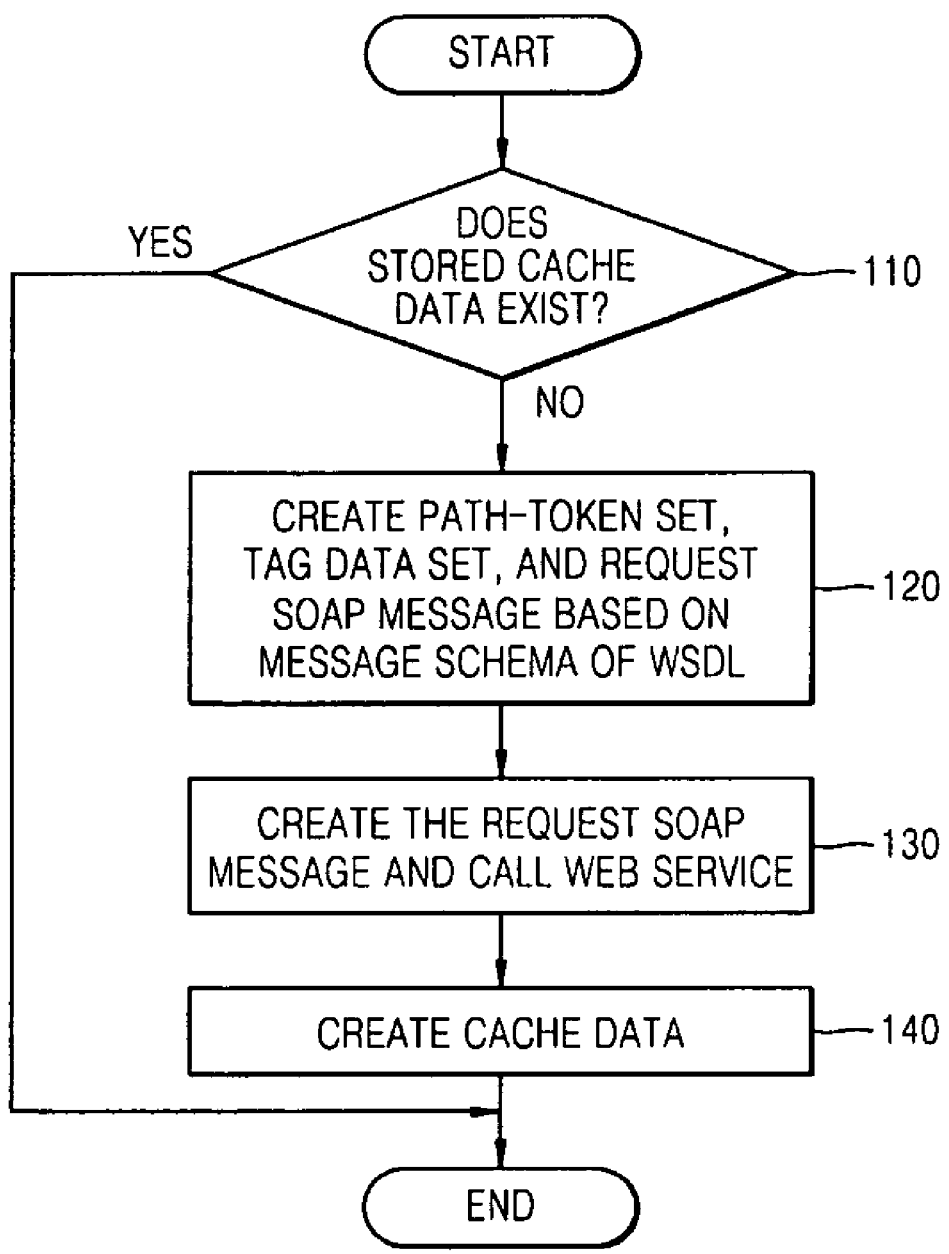
FIG. 1 is a flowchart showing operations of a path-token-based web service caching method according to an embodiment of the present invention.
Figure 2:
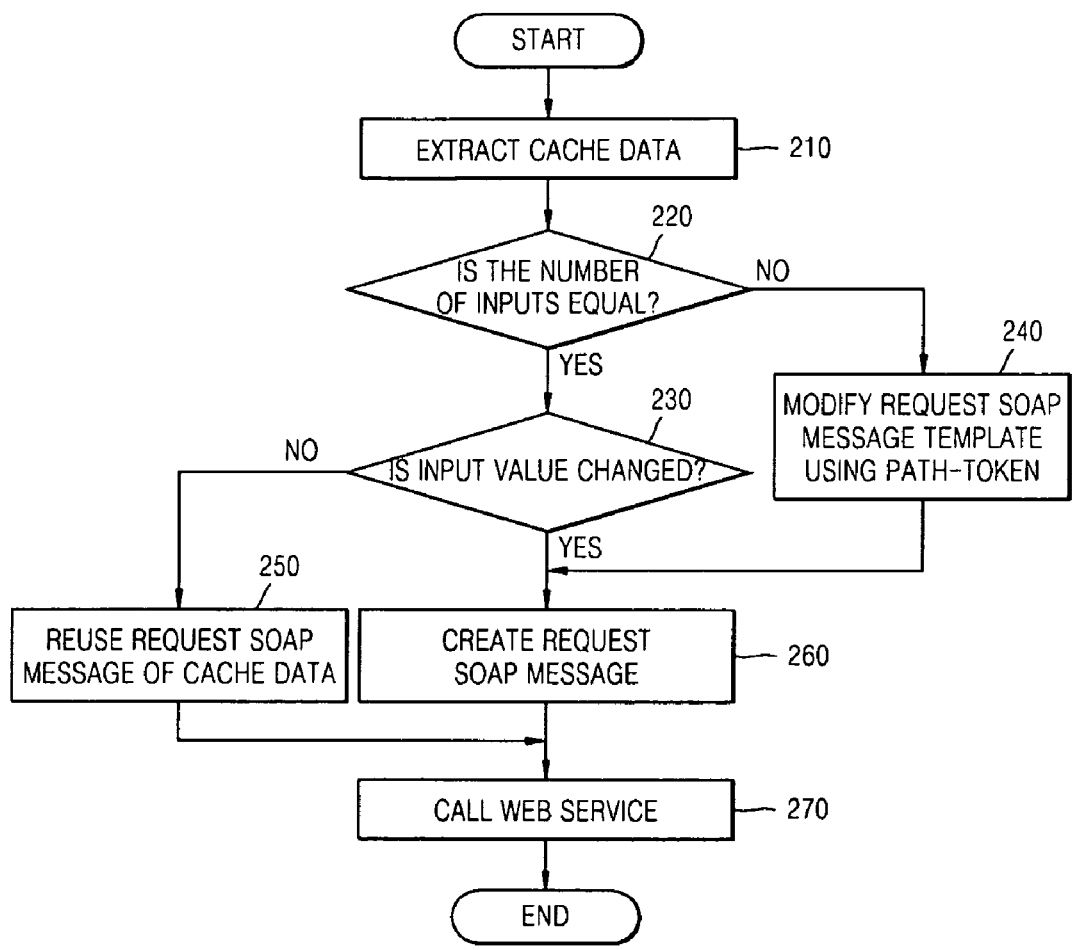
FIG. 2 is a flowchart showing operations of a path-token-based web service caching method according to another embodiment of the present invention.

Exemplary embodiments according to the present invention will now be described in detail with reference to the accompanying drawings. FIG. 1 is a flowchart showing operations of a path-token-based web service caching method according to an embodiment of the present invention, and FIG. 2 is a flowchart showing operations of a path-token-based web service caching method according to another embodiment of the present invention.

FIG. 1 shows an example of creating cache data when stored cache data does not exist.

First, when a web service call request exists, it is determined whether or not the stored cache data exists (operation 110). When the cache data exists, the cache data is used. When the cache data does not exist, operations for creating the cache data are performed as follows. When the cache data does not exist, a predetermined path-token set and a predetermined tag data set are created based on a message schema of Web Services Description Language (WSDL), and a request Simple Object Access Protocol (SOAP) message is created (operation 120). More particularly, after the message schema and SOAP binding information are extracted from the WSDL, schema parsing is performed by analyzing the message schema, and a message template is created from the parsed message schema. The path-token set and the tag data set are then created based on the message template.

Next, a request SOAP message template is created by applying a path-token with the request SOAP message created in operation 120, and the web service is called (operation 130). In this case, after a node corresponding to the path-token is searched for from the request SOAP message template, a value of the node is replaced with the path-token so that the request SOAP message template is created.

Lastly, cache data including the tag data set, input values set of a web service operation, the request SOAP message template, the request SOAP message, and SOAP binding information are created (operation 140).

Next, the web service caching method based on the created cache data as described above is described with reference to FIG. 2. First, the cache data is extracted (operation 210). Next, it is determined whether or not the number of inputs of the web service operation is equal (operation 220). When the number is equal, the request SOAP message template using the path-token is modified (operation 240), and when the number is not equal, it is determined whether or not an input value is changed (operation 230). In operation 240, after a message template is created, a message template portion of the request SOAP message template body is replaced with the created message template so that the request SOAP message template is modified.

Next, when the number of inputs of the web service operation is equal, it is determined whether or not the input value of the web service operation is changed (operation 230). When the input value is not changed, the request SOAP message of the cache data is used (operation 250), and when the input value is changed, a request SOAP message is created by using the request SOAP message template (operation 260). In this case, after a path-token is searched for from the request SOAP message template based on the input values set and the request SOAP message template using the path-token, the path-token is replaced with the changed input value so that a new request SOAP message is created.

Lastly, the cache data is restored, the web service is called, and the operations are ended (operation 270).

Figure 3:
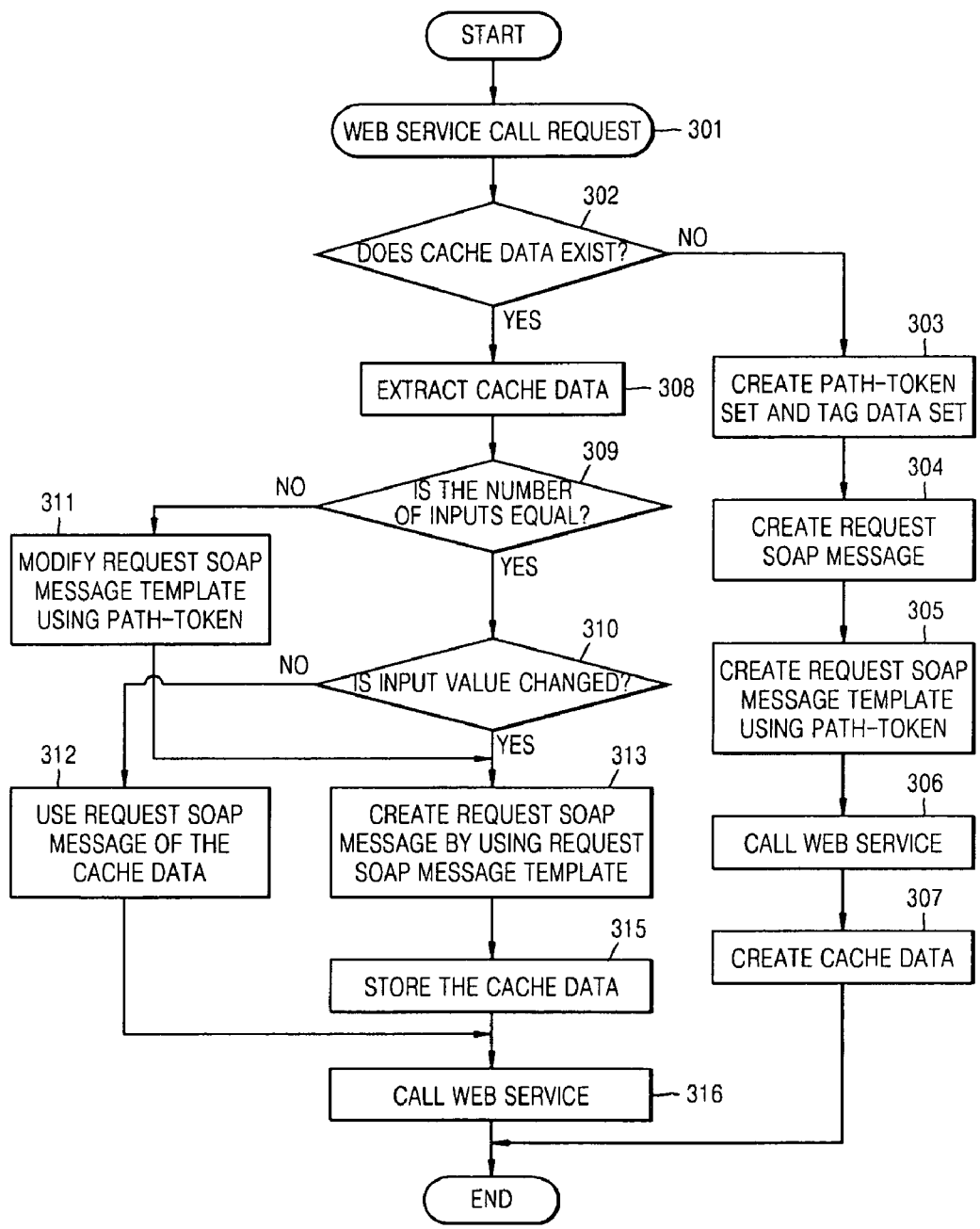
FIG. 3 is a flowchart showing operations of a path-token-based web service caching method according to another embodiment of the present invention.
Figure 4:
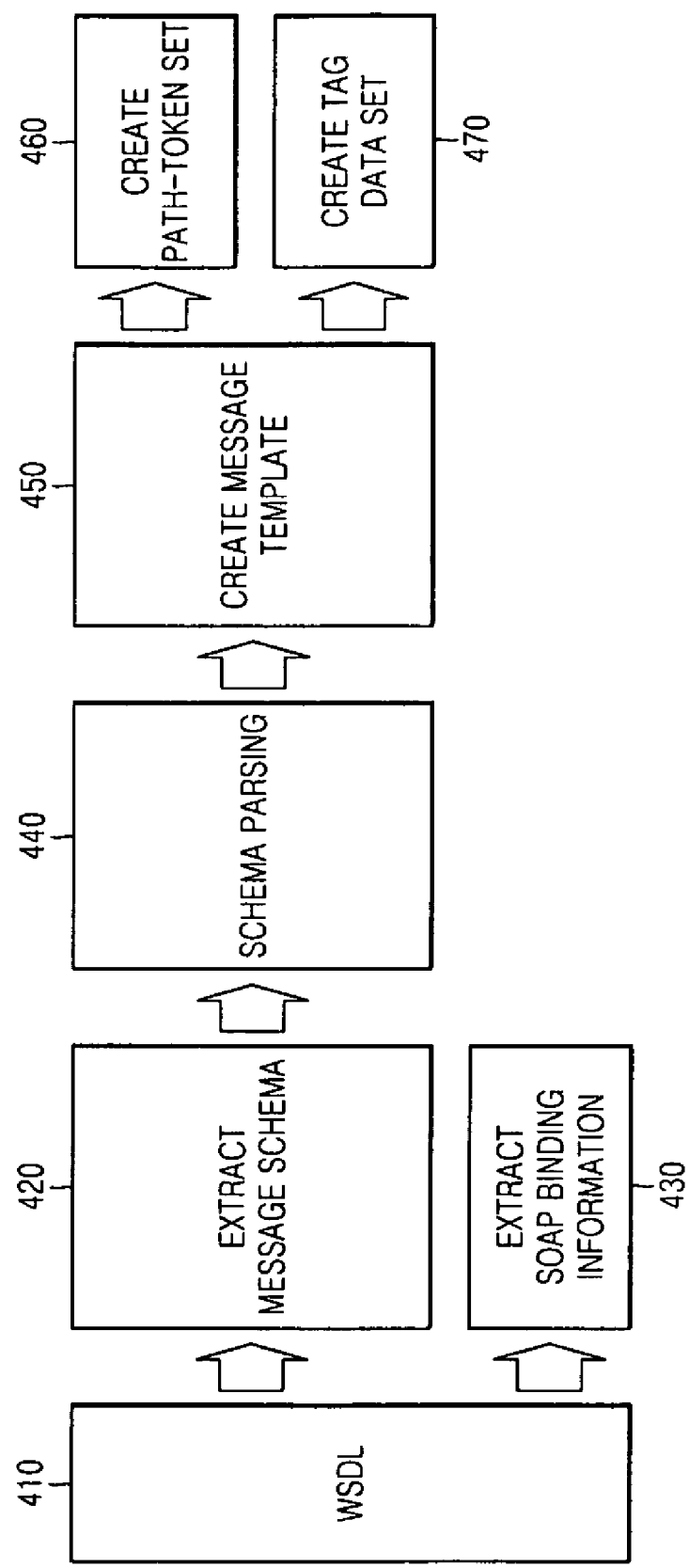
FIG. 4 is a flowchart showing a process of creating a path-token set and a tag data set.
Figure 5:
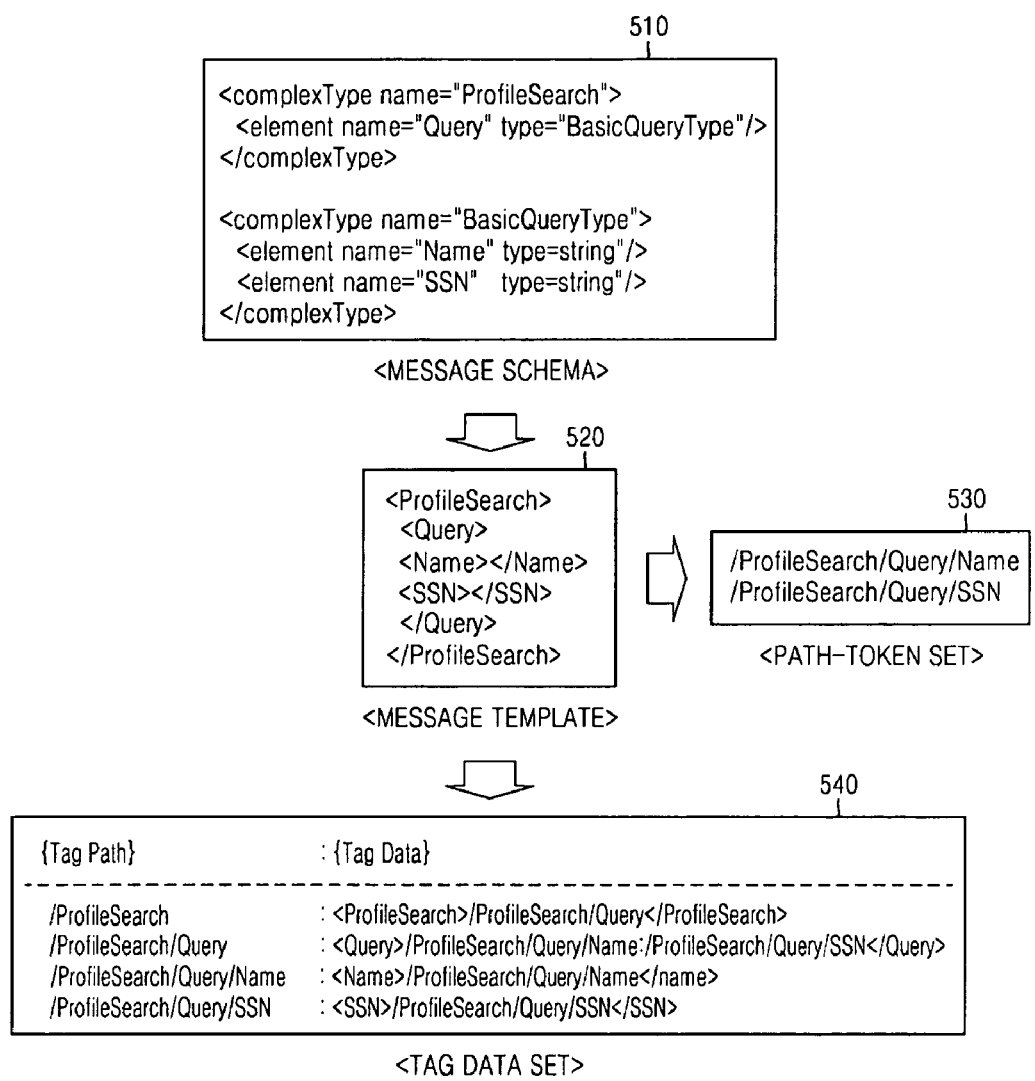
FIG. 5 is a view showing an example of creating a path-token set and a tag data set.

The path-token-based web service caching method according to embodiments of the present invention will now be described with reference to FIGS. 3 to 13. FIG. 3 is a flowchart showing operations of a path-token-based web service caching method according to another embodiment of the present invention. FIG. 4 is a flowchart showing a process of creating a path-token set and a tag data set. FIG. 5 is a view showing an example of creating a path-token set and a tag data set.

Figure 6:
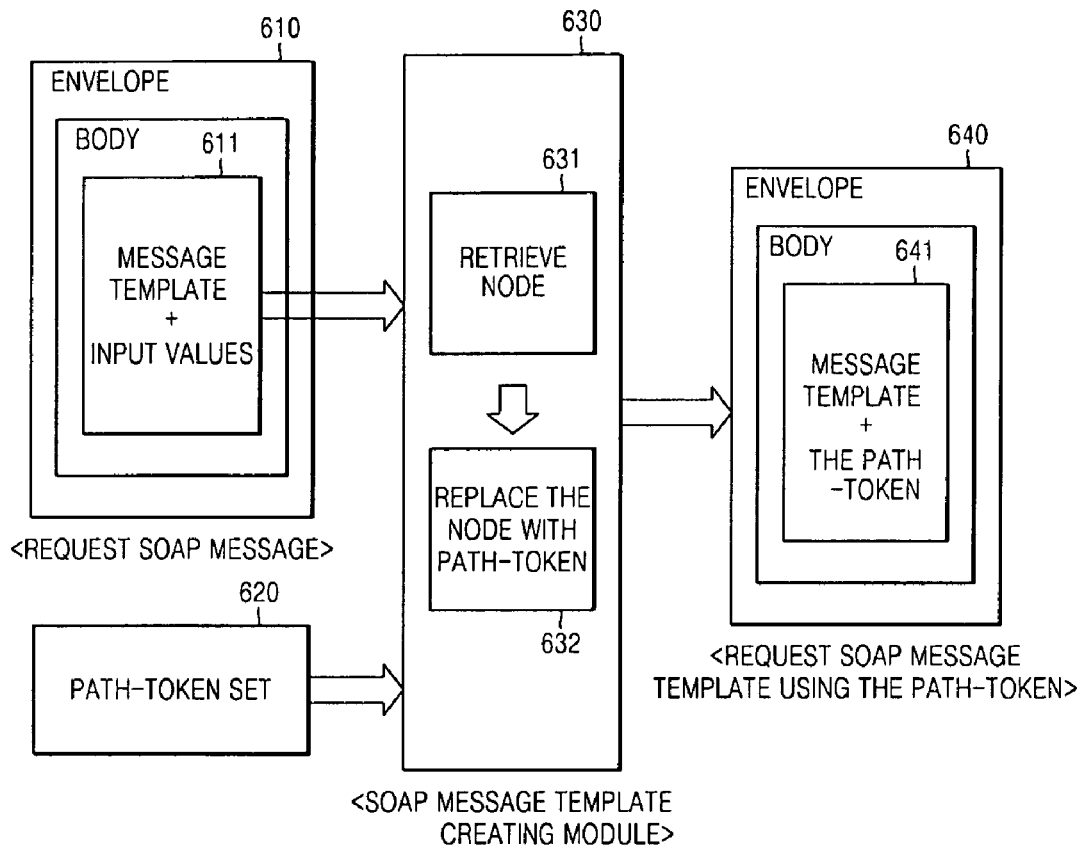
FIG. 6 is a flowchart showing a process of creating a request Simple Object Access Protocol (SOAP) message template using a path-token.
Figure 7:
FIG. 7 is a view showing an example of generating a request SOAP message template using a path-token.
Figure 8:
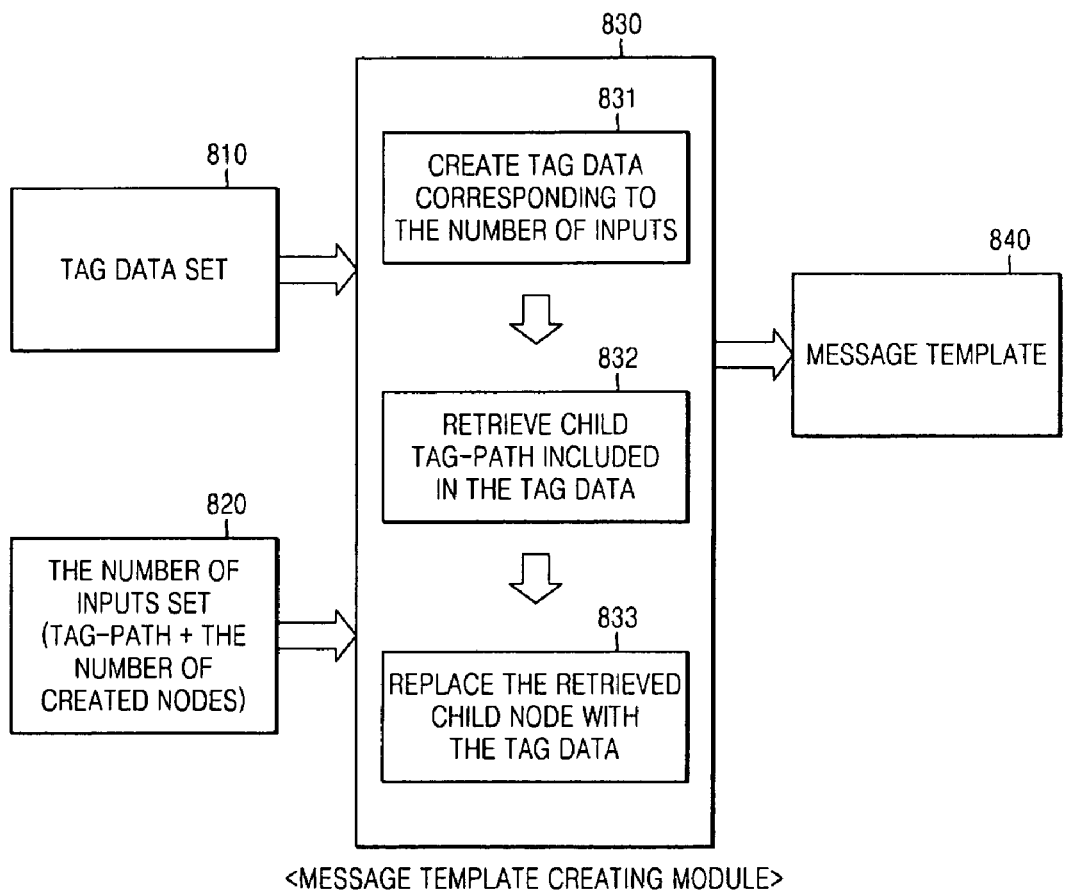
FIG. 8 is a flowchart showing a process of creating a message template using a tag data set.
Figure 9:
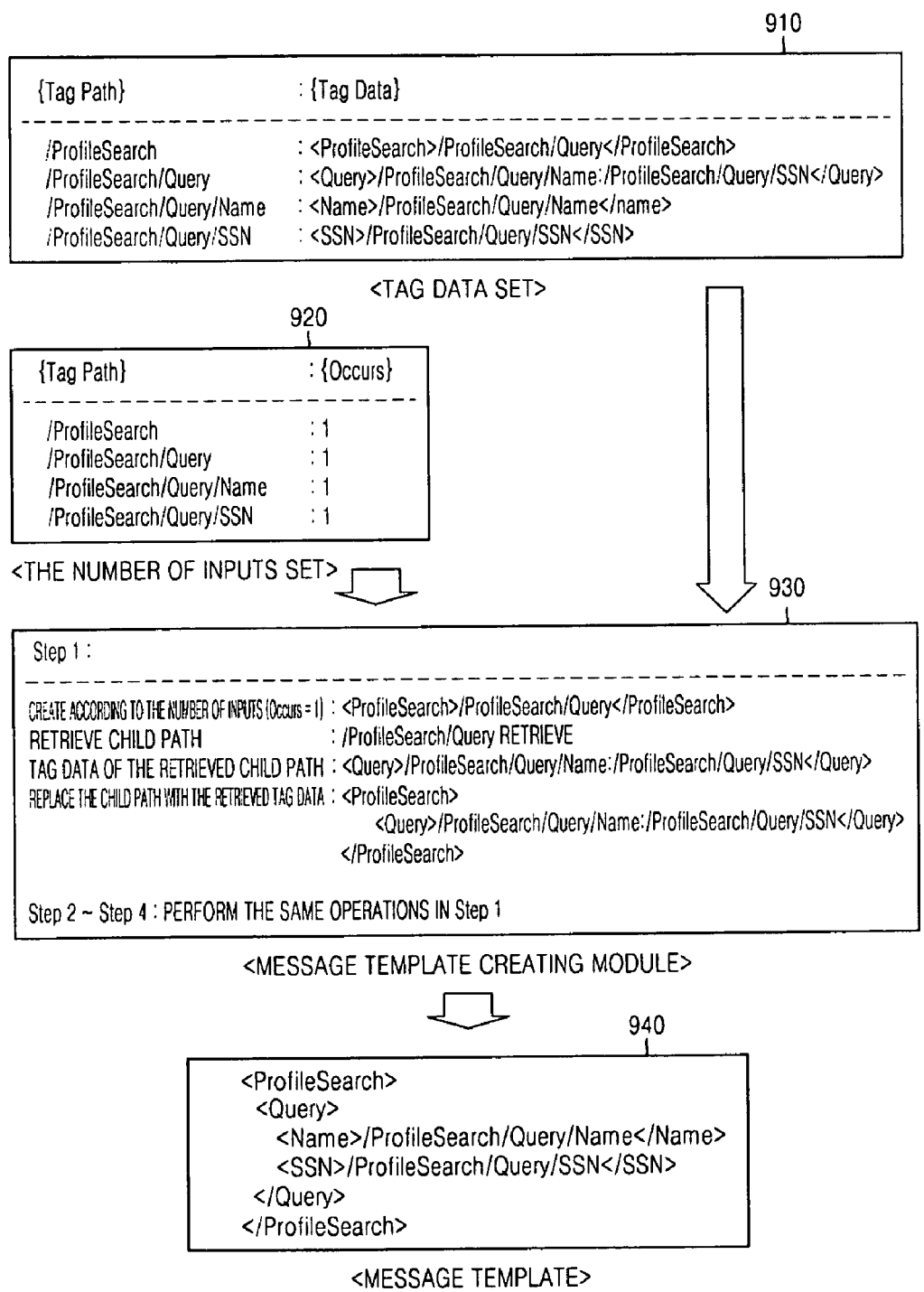
FIG. 9 is a view showing an example of generating a message template using a tag data set.
Figure 10:
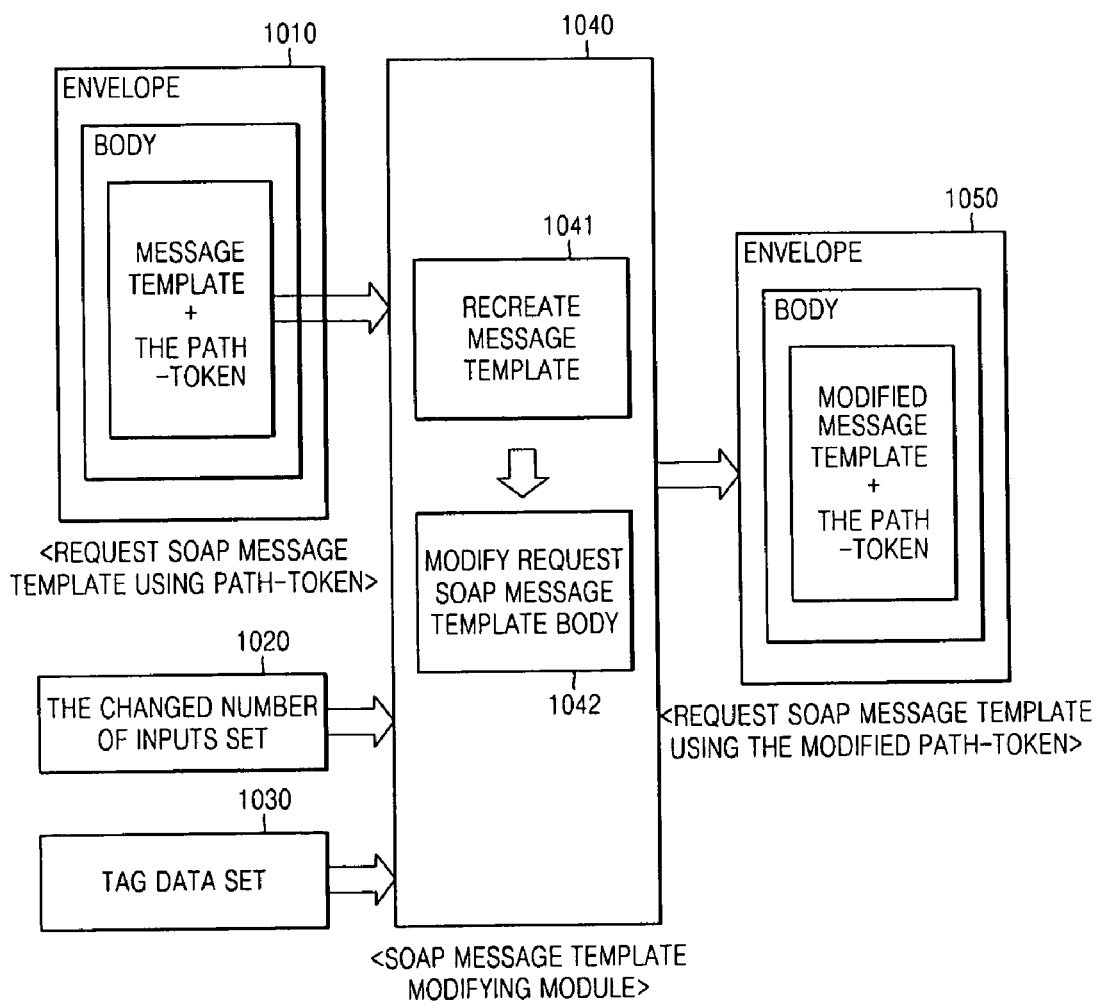
FIG. 10 is a flowchart showing a process of modifying a request SOAP message template according to a change in the number of inputs.
Figure 11:
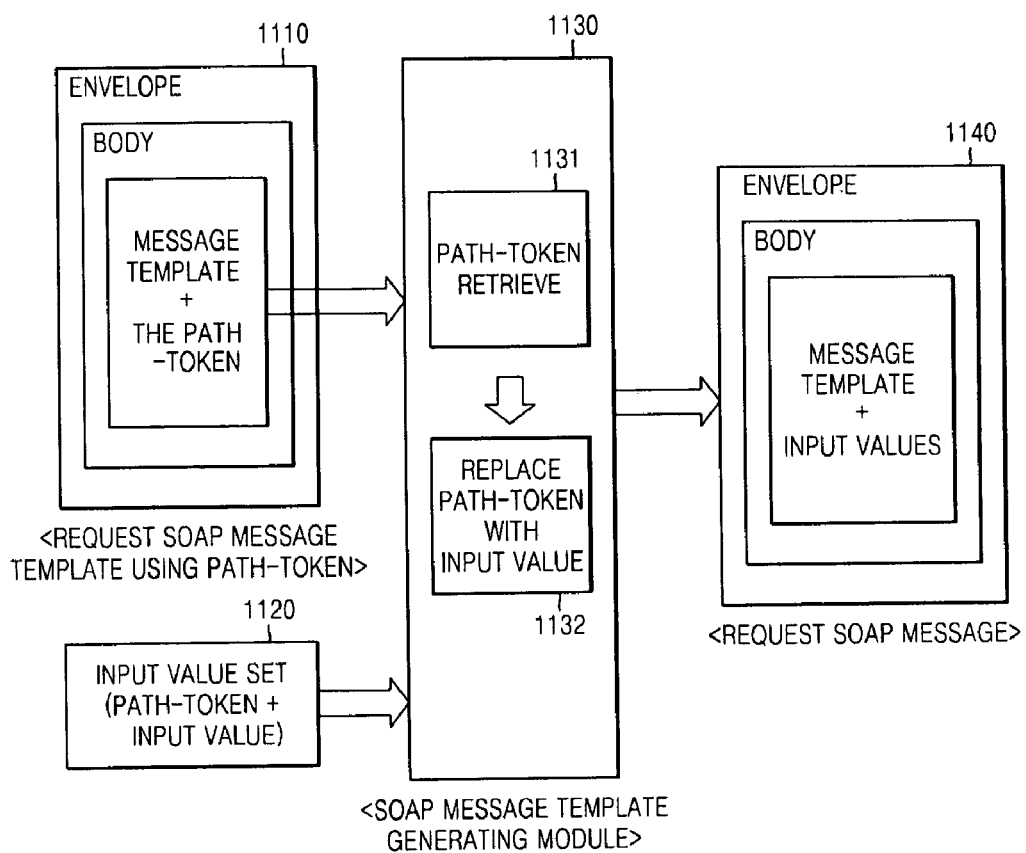
FIG. 11 is a flowchart showing a process of creating a request SOAP message from a request SOAP message template using a path-token.
Figure 12:
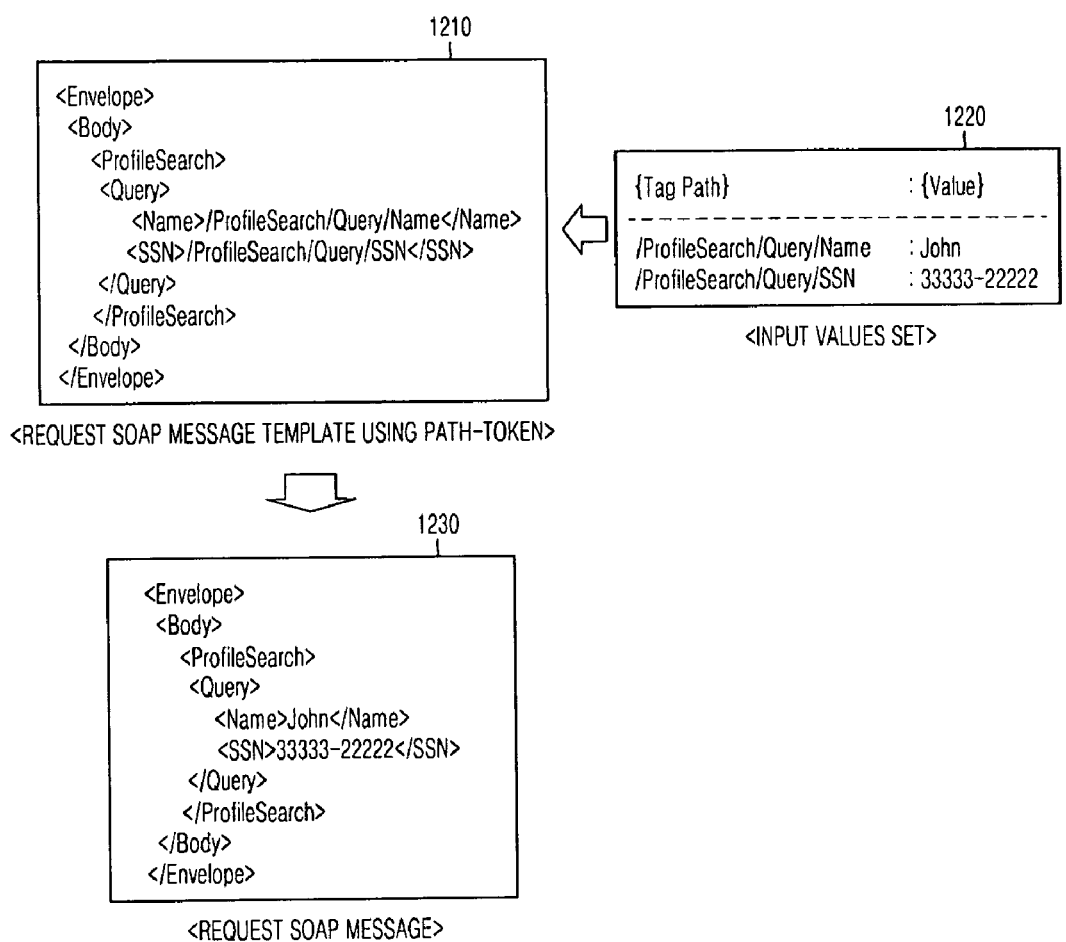
FIG. 12 is a view showing an example of creating a request SOAP message from a request SOAP message template using a path-token.
Figure 13:
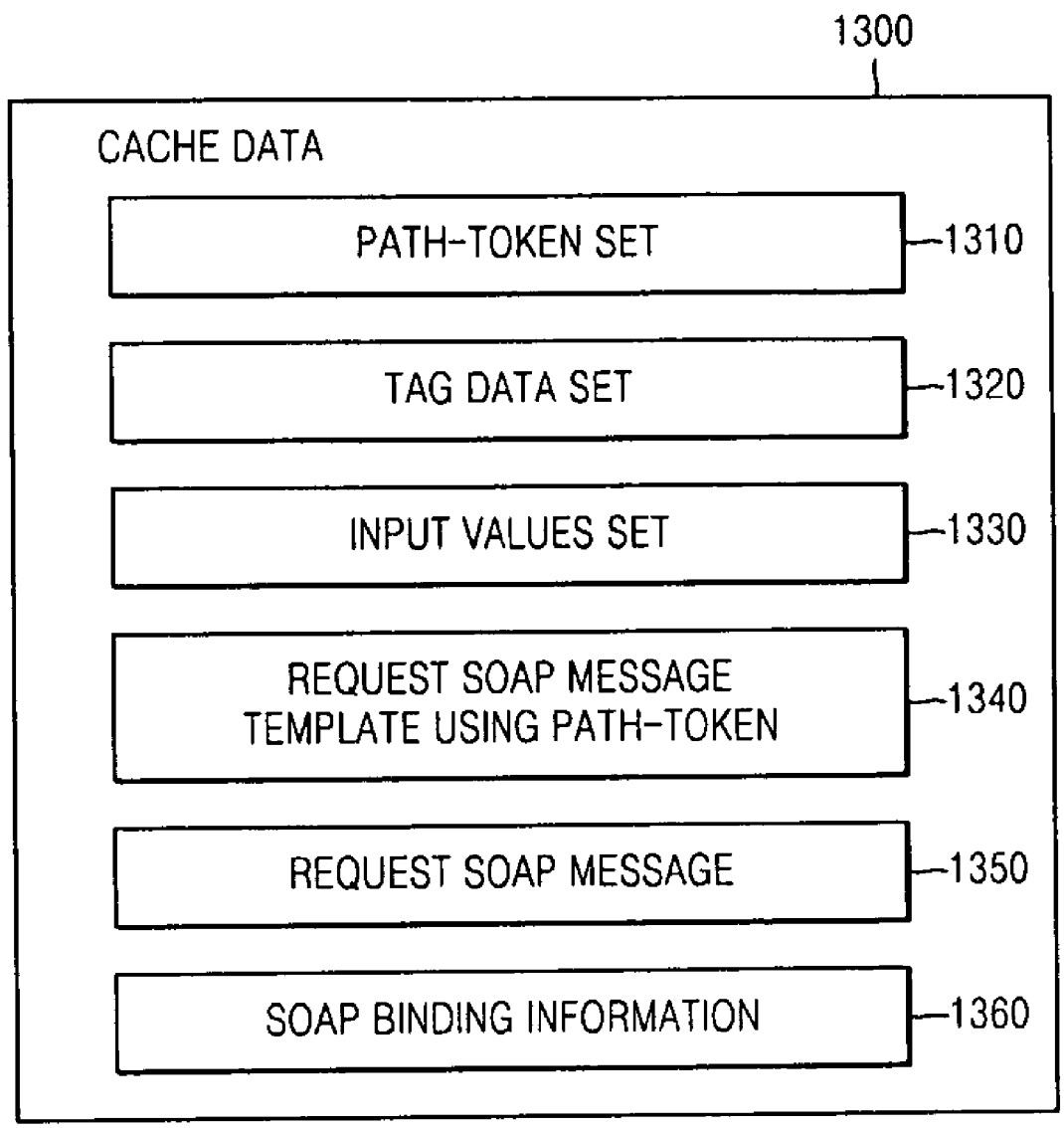
FIG. 13 is a view showing a structure of cache data.

FIG. 6 is a flowchart showing a process of creating a request SOAP message template using a path-token. FIG. 7 is a view showing an example of generating a request SOAP message template using a path-token. FIG. 8 is a flowchart showing a process of creating a message template using a tag data set. FIG. 9 is a view showing an example of generating a message template using a tag data set FIG. 10 is a flowchart showing a process of modifying a request SOAP message template according to a change in the number of inputs. FIG. 11 is a flowchart showing a process of creating a request SOAP message from a request SOAP message template using a path-token. FIG. 12 is a view showing an example of creating a request SOAP message from a request SOAP message template using a path-token. FIG. 13 is a view showing a structure of cache data.

Referring to FIG. 3, a process is started by receiving a web service call request (operation 301). Next, in order to determine whether or not the same web service operation has been previously called, cache data is searched by being retrieving from cache storage (operation 302). When the associated cache data 1300 (shown in FIG. 13) exists in the cache storage, the cache data is extracted (operation 308). Next, it is determined whether or not the number of inputs of the web service operation is changed (operation 309). When the number of inputs of the web service operation is changed, a request SOAP message template using a path-token is modified (operation 311). When the number of inputs of the web service operation is not changed, it is determined whether or not an input value of the web service operation is changed (operation 310). When the input value of the web service operation is changed, the path-token is replaced with the input value of the web service operation in the request SOAP message template using the path-token so that a request SOAP message is created (operation 313). Since the request SOAP message template using the path-token and the request SOAP message are modified, the associated cache data is modified and restored (operation 315). When the input value of the call requested web service operation is not changed, a request SOAP message of the cache data 1300 is used (operation 312). The web service is called by using the request SOAP message (operation 316). When the associated cache data do not exist in the cache storage, a message schema is obtained from the WSDL of the web service to-be-called, so that a path-token set and a tag data set are created (operation 303). Next, a request SOAP message is created (operation 304), and a path-token is used for the request SOAP message so that a request SOAP message template may be created (operation 305). Next, the web service is called by using the request SOAP message (operation 306). The cache data 1300 including the path-token set 1310, the tag data set 1320, input values set 1330, the request SOAP message template using the path-token 1340, the request SOAP message 1350, SOAP binding information 1360 are created (operation 307). In this case, each element of the cache data is stored in string form. Then, the process is ended.

A process of creating the path-token set and the tag data set will now be described in detail with reference to FIG. 4. The message schema defining a message is extracted from the WSDL 410 of the web service to-be-called (operation 420). The SOAP binding information such as SOAP Style, SOAP Use, SOAP Action, and SOAP Location is also extracted (operation 430). The SOAP Style and the SOAP Use are used to constitute the tag data, and the SOAP Action and the SOAP Location are used to call the web service. In order to extract essential elements by analyzing the extracted message schema, schema parsing is performed (operation 440). A message template having an extensible markup language (XML) document object model (DOM) structure is created from the parsed message schema (operation 450). Next, the path-token set and the tag data set are created in the message schema (operations 460 and 470, respectively). The path-token set represents information on paths from a root node to leaf nodes which do not have child nodes. The path information serves as a pointer to indicate easy move to the leaf node and follows an XPath expression. Here, the path information is defined as the path-token. In the tag data set, the message template of the XML DOM structure is represented in string form, so that the tag data set includes a tag-path and tag data. The tag data includes a tag string of each node, and the tag string includes the tag-path with respect to a first child node. Tag data of the leaf node include the tag-path thereof. To constitute the tag data, the SOAP Style and the SOAP Use of the SOAP binding information are used. By using the information, attribute information is included in the tag string of each node. When the number of inputs is changed, the tag data set is used to re-create the message template.

FIG. 5 shows an example of a process of creating the path-token set and the tag data set. The message schema 510 is obtained from the WSDL, and the message template 520 is created from the message schema 510. Next, the path-token set 530 and the tag data set 540 with respect to the leaf nodes are created from the message template 520.

FIG. 6 shows a process of creating the request SOAP message template using the path-token. When the stored associated cache data 1300 does not exist, the request SOAP message 610 is created in the XML DOM structure using the message schema 510 and the input values. The request SOAP message body is structured in a message template form with respect to an input message of the web service operation to-be-called, and the message template includes an input value in the leaf node (operation 611). A message template including the input value 611 and the path-token set 620 are input to a SOAP message template creating module 630. A node corresponding to the path-token in the message template is searched for in the module 630 (operation 631), and a value of the node is replaced with the path-token (operation 632). After the module performance is ended, the request SOAP message template using the path-token 640 is obtained. The request SOAP message template body is formed so as to have the message template form including the path-token (operation 641). The request SOAP message template using the path-token is converted into string form and stored in the cache data. This is because the path-token can be rapidly retrieved by string matching. A desired node can be easily searched for by using the path-token. Alternatively, a method of using the request SOAP message having the XML DOM structure may be employed. This is because a desired node can be easily searched for by using the XML DOM structure. However, when a message having the XML DOM structure is stored in the cache data or extracted therefrom, XML encoding/decoding processes are performed. In the processes, there is a time delay and memory is used. Therefore, by using the string message using the path-token, the desired node can be rapidly retrieved, and the time delay and the memory usage due to cache data storing and extracting is reduced.

FIG. 7 shows an example of generating the request SOAP message template using the path-token. The path-token set 720 is used for a message template portion of the request SOAP message body, so that the associated nodes are obtained, and each node value is replaced with the path-token of the path-token set 720. After that, the request SOAP message template using the path-token 730 is obtained.

FIG. 8 shows a process of generating the message template using the tag data set. The tag data set 810 and the number of inputs set 820 are input to the message template creating module 830. The number of inputs set includes the tag-path and data having the number of created nodes. Here, the tag data set 810 and the number of inputs set 820 are represented in string form. In the message template creating module 830, tag data is created according to the number of inputs (operation 831), a tag-path of the first child node included in the tag data is retrieved (operation 832), and the child tag-path portion is replaced with the tag data of the retrieved tag-path (operation 833). The aforementioned process is performed on the entire tag data set, and thus the message template 840 is obtained. The created message template is represented in string form. Since all the operations of the message template creating module 830 are performed by string retrieving and string matching, the message template is rapidly created.

FIG. 9 shows an example of generating a message template using the tag data set. The tag data set 910 and the number of inputs set 920 are input to the message template creating module 930 so that the message template 940 may be created.

FIG. 10 shows a process of modifying the request SOAP message template when the number of inputs is changed. When the number of inputs is changed, the request SOAP message template using the path-token 1010, the changed number of inputs set 1020, and the tag data set 1030 are input to the SOAP message template creating module 1040. In this case, the request SOAP message template using the path-token 1010 is represented in string form. The message template is re-created by using the message template creating module 830 of FIG. 8, and the message template portion of the request SOAP message template is replaced with the re-created message template in order to modify the request SOAP message template (operation 1042), so that the request SOAP message template corresponding to the changed number of inputs is created (operation 1050). The message template creating module 830 of FIG. 8 creates the message template by using string retrieving and matching methods, and the message template created by the aforementioned process is included in the request SOAP message template by using the string matching method. Therefore, the request SOAP message template is rapidly created according to the entirely changed number of inputs.

FIG. 11 shows a process of creating the request SOAP message in the request SOAP message template using the path-token. When the input value is changed, the request SOAP message template 1110 using the path-token and the input values set 1120 are input to an input value replacing module 1130. The input values set includes the path-token and data having the input values. In this case, the request SOAP message template using the path-token is represented in string form. The input value replacing module 1130 searches the path-token from the request SOAP message template 1110 (operation 1131). When the path-token is searched, the path-token is replaced with the changed input value (operation 1132). After that, a new SOAP request message is obtained (operation 1140). In this case, searching for the path-token operation 1131 is rapidly performed by using the string matching method. In the conventional web service caching method, when an input value is changed, the request SOAP message is re-created. However, in the web service caching method according to the present invention, the path-token corresponding to the input of the request SOAP message template is replaced with the input value, so that the new request SOAP message is created. Therefore, time delay and memory usage in request SOAP message creating can be reduced.

FIG. 12 shows an example of creating the request SOAP message in the request SOAP message template using the path-token. The input values set 1220 is used for the request SOAP message template using the path-token 1210 so that the path-token may be retrieved, and the retrieved path-token is replaced with the input value, in order that the new request SOAP message 1230 is obtained.

FIG. 13 shows the cache data 1300. The cache data 1300 includes the path-token set 1310, the tag data set 1320, the input values set 1330, the request SOAP message template using the path-token 1340, the request SOAP message 1350, and the SOAP binding information 1360.

As described above, the conventional web service caching method has problems in that, when the number of inputs is changed, the cached data cannot be used, so that a new request SOAP message is created. In addition, when the input value is changed, the associated input node cannot be exactly searched for using only the tag information of the input value. On the contrary, the path-token-based web service caching method according to the present invention has advantages in that, the aforementioned problems can be solved, so that an efficient web service call mechanism is available.

The path-token-based web service caching method according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A path-token-based web service caching method comprising:
   (a) determining whether or not stored cache data exists when a web service call request exists;
   (b) when the cache data does not exist, creating a predetermined path-token set and a predetermined tag data set based on a message schema of Web Services Description Language (WSDL), and creating a request Simple Object Access Protocol (SOAP) message;
   (c) creating a request SOAP message template by applying a path-token on the created request SOAP message, and calling the web service; and
   (d) creating cache data including the tag data set, input values set of web service operation, the request SOAP message template, the request SOAP message, and SOAP binding information.

2. The path-token-based web service caching method of claim 1, wherein step (b) comprises:
   (b1) extracting the message schema and the SOAP binding information from the WSDL;
   (b2) performing schema parsing by analyzing the message schema, and creating a message template from the parsed message schema; and
   (b3) creating the path-token set and the tag data set based on the message template.

3. The path-token-based web service caching method of claim 1, wherein step (c) comprises searching a node corresponding to the path-token in the request SOAP message template, and creating the request SOAP message template by replacing a value of the node with the path-token.

4. A web service caching method based on cache data created based on a path-token set and a tag data set, comprising:
   (a) extracting the cache data;
   (b) determining whether or not the number of inputs of a web service operation is equal, when the number is not equal, modifying a request SOAP message template using a path-token, and when the number is equal, determining whether or not an input value of the web service operation is changed;

(c) when the input value of the web service operation is not determined to be changed, using a request SOAP message of the cache data, and when the input value of the web service operation is determined to be changed, creating a request SOAP message by using the request SOAP message template; and (d) storing the cache data and calling the web service.

5. The web service caching method of claim 4, wherein step (b) comprises:
(b1) recreating a message template; and
(b2) modifying the request SOAP message template by replacing a message template portion of the request SOAP message template body with the re-created message template.

6. The web service caching method of claim 4, wherein the step (c) comprises:
(c1) retrieving the path-token from the request SOAP message template based on the request SOAP message template using the path-token and an input values set of the web service operation; and
(c2) when the path-token is retrieved, creating a new request SOAP message by replacing the path-token with an input value of the modified web service operation.

7. A path-token-based web service caching method comprising:
(a) determining whether or not stored cache data exists when a web service call request exists;
(b) when the stored cache data does not exist, creating cache data by creating a predetermined path-token set and a predetermined tag data set based on a message schema of WSDL; and
(c) when the stored cache data exists, extracting the cache data, determining whether or not to modify an SOAP message according to a change in the number of inputs of a web service operation and a change in an input value of the web service operation, and calling the web service.

8. The path-token-based web service of claim 7, wherein step (b) comprises:
(b1) creating the predetermined path-token set and the predetermined tag data set based on the message schema of the WSDL;
(b2) creating a request SOAP message;
(b3) creating a request SOAP message template by using a path-token for the created request SOAP message, and calling the web service; and
(b4) creating the cache data including the tag data set, input values set, the request SOAP message template, the request SOAP message, and SOAP binding information.

9. The path-token-based web service caching method of claim 8, wherein step (b1) comprises:
(b11) extracting the message schema and the SOAP binding information from the WSDL;
(b12) performing a schema parsing by analyzing the message schema, and creating a message template from the parsed message schema; and
(b13) creating the path-token set and the tag data set based on the message template.

10. The path-token-based web service caching method of claim 9, wherein, in step (b), the message template is created in an extensible markup language document object model (XML DOM) structure.

11. The path-token-based web service caching method of claim 2,
wherein the path-token set is information on paths from root node to leaf nodes which do not have child nodes, and
wherein the tag data set includes tag-path and tag data.

12. The path-token-based web service caching method of claim 9, wherein the path-token set is information on paths from root node to leaf nodes which do not have child nodes, and
wherein the tag data set includes tag-path and tag data.

13. The path-token-based web service caching method of claim 8, wherein step (b3) comprising:
searching a node corresponding to the path-token in the request SOAP message template, and
creating the request SOAP message template by replacing a value of the node with the path-token.

14. The path-token-based web service caching method of claim 7, wherein step (c) comprises:
(c1) when the number of inputs of the web service operation is not determined to be equal, modifying a request SOAP message template using a path-token;
(c2) when the number of inputs of the web service operation is determined to be equal, determining whether or not the input value of the web service operation is equal, and when the input value is equal, using a request SOAP message of the cache data, and when the input value is not equal, creating a request SOAP message; and
(c3) storing the cache data, and calling the web service.

15. The path-token-based web service caching method of claim 14, wherein step (c1) comprises:
(c11) creating a message template; and
(c12) modifying the request SOAP message template by replacing a message template portion of the request SOAP message template body with the created message template.

16. The path-token-based web service caching method of claim 14, wherein step (c2) comprises:
(c21) retrieving the path-token from the request SOAP message template based on the request SOAP message template using the path-token and an input values set of the web service operation; and
(c22) when the path-token is retrieved, creating a new request SOAP message by replacing the path-token with the input value of the web service operation.

17. A computer readable recording medium recording computer programs for executing a path-token-based web service caching method, wherein the method comprises:
(a) determining whether or not stored cache data exists when a web service call operation exists;
(b) when the cache data does not exist, creating a predetermined path-token set and a predetermined tag data set based on a message schema of WSDL, and creating a request SOAP message;
(c) creating a request SOAP message template by applying a path-token on the created request SOAP message, and calling the web service; and
(d) creating cache data including the tag data set, input values set of web service operation, the request SOAP message template, the request SOAP message, and SOAP binding information.

18. A computer readable recording medium recording computer programs for executing a path-token-based web service caching method which is based on cache data created based on a path-token set and a tag data set, wherein the method comprises:
(a) extracting the cache data;
(b) determining whether or not the number of inputs of a web service operation is equal, and when the number is not equal, modifying a request SOAP message template using a path-token, and when the number is equal, determining whether or not an input value of the web service operation is changed;

(c) when the input value of the web service operation is determined not to be changed, using a request SOAP message of the cache data, and when the input value of the web service operation is determined to be changed, creating a request SOAP message by using the request SOAP message template; and (d) storing the cache data and calling the web service.

19. A computer readable recording medium recording computer programs for executing a path-token-based web service caching method, wherein the method comprises:

(a) determining whether or not stored cache data exists when a web service call request exists;

(b) when the stored cache data does not exist, creating cache data by creating a predetermined path-token set and a predetermined tag data set based on a message schema of WSDL; and (c) when the stored cache data exists, extracting the cache data, determining whether or not to modify an SOAP message according to a change in the number of inputs of a web service operation and a change in an input value of the web service operation, and calling the web service.

\* \* \* \* \*